(12) United States Patent
Li et al.

(10) Patent No.: US 8,179,454 B2
(45) Date of Patent: May 15, 2012

(54) IMAGE COMPENSATION METHOD AND IMAGE ACQUISITION DEVICE USING THE SAME

(75) Inventors: Yun-Chin Li, Banciao (TW); Chin-Lung Yang, Miaoli County (TW)

(73) Assignee: Altek Corporation, Hsinchu (TW)

( * ) Notice: Subject to any disclaimer, the term of this patent is extended or adjusted under 35 U.S.C. 154(b) by 468 days.

(21) Appl. No.: 12/536,737

(22) Filed: Aug. 6, 2009

(65) Prior Publication Data
US 2010/0123806 A1 May 20, 2010

(30) Foreign Application Priority Data
Nov. 19, 2008 (TW) .............................. 97144660 A

(51) Int. Cl.
*H04N 5/217* (2011.01)
*G06K 9/40* (2006.01)
*G06K 9/00* (2006.01)
(52) U.S. Cl. ..................... 348/241; 382/167; 382/274
(58) Field of Classification Search .............. 382/167, 382/274; 348/241
See application file for complete search history.

(56) References Cited

U.S. PATENT DOCUMENTS

| 2007/0097251 A1* | 5/2007 | Fujioka et al. ............... 348/335 |
| 2008/0273111 A1* | 11/2008 | Gustavsson et al. .......... 348/340 |
| 2009/0034962 A1* | 2/2009 | Mitani ........................... 396/535 |

* cited by examiner

*Primary Examiner* — Jason Chan
*Assistant Examiner* — Stephen Coleman
(74) *Attorney, Agent, or Firm* — Apex Juris, PLLC; Tracy M. Heims

(57) ABSTRACT

An image compensation method adapted to reduce noise of a first image captured by an image acquisition device at a high ISO mode. The image compensation method includes the following steps. A Bayer pattern is obtained from the first image. A green pixel signal, a low-resolution binned original luminance signal, and an original chrominance signal are respectively generated according to the Bayer pattern. A high-resolution analog luminance signal is generated by using the green pixel signal. The high-resolution analog luminance signal and the low-resolution binned original luminance signal are combined, and a compensated high-resolution luminance signal is output. A second image is generated by combining the compensated high-resolution luminance signal and the original low-noise chrominance signal.

8 Claims, 4 Drawing Sheets

IMAGE COMPENSATION METHOD AND IMAGE ACQUISITION DEVICE USING THE SAME

CROSS-REFERENCE TO RELATED APPLICATIONS

This non-provisional application claims priority under 35 U.S.C. §119(a) on Patent Application No(s). 097144660 filed in Taiwan, R.O.C. on Nov. 19, 2008 the entire contents of which are hereby incorporated by reference.

BACKGROUND OF THE INVENTION

1. Field of Invention

The present invention relates to an image compensation method and a image acquisition device using the same, and more particularly to an image compensation method capable of reducing a noise and a image acquisition device using the same.

2. Related Art

With the popularity of image acquisition devices, more and more users have opportunities to take photos. For beginners, the captured images often become blurred due to handshakes during shooting. To solve this problem, the following methods for improvement are proposed. In a first method, a shake detection mechanism of a lens or camera body is used to correct the shake during shooting. In a second method, the International Standard Organization (ISO) is increased when shooting, because a higher ISO can shorten the shutter time and meanwhile achieves the same exposure as that obtained in a longer shutter time at a lower ISO.

The defect of the first method lies in that the shake detection mechanism requires additional hardware equipment, which increases the manufacturing cost of cameras. The second method does not require additional hardware equipment, so the manufacturing cost of the second method is lower than that of the first method. However, the defect of the second method lies in that noise often appears in images captured at a high ISO, especially when the ISO is increased to 800 or higher.

The noise mainly originates from statistical errors in a process when a charge coupled device (CCD) or a complementary metal-oxide semiconductor (CMOS) in the image acquisition device receives photons in light and converts the photons into electronic signals. The material, quantum effect, and signal amplification of the photosensitive element are also sources of the noise. In addition, the photosensitive element may generate electrons and holes due to the temperature variation in a lightless environment, which is referred to as a dark current effect. The additional electrons cause false determination of a signal processor, resulting in the generation of noise. The dark current increases with the rise of the ambient temperature, and is even higher after the temperature of the photosensitive element rises after long use.

Therefore, a method for processing digital images by low ISO and pixel binning is also proposed. The pixel binning is to combine surrounding pixels of a target pixel, so as to improve the brightness of the target pixel. Although such a method of pixel binning can prevent the noise caused by the increase of the ISO, the resolution of the digital image is lowered after binning the surrounding pixels.

SUMMARY OF THE INVENTION

Accordingly, the present invention is directed to an image compensation method and a image acquisition device using the same, the method is adapted to reduce noise of an image captured in a high International Standards Organization (ISO) mode while eliminating the foregoing drawbacks in the related art.

In order to achieve the above objective, the present invention discloses an image compensation method to reduce noise of a first image captured by an image acquisition device at a high ISO mode, the method includes the steps of: obtaining a Bayer pattern from the first image; respectively generating a green pixel signal, a binned original luminance signal with low-resolution, and an original chrominance signal according to the Bayer pattern; generating a high-resolution analog luminance signal by using the green pixel signal; combining the high-resolution analog luminance signal and the low-resolution binned original luminance signal, and outputting a compensated high-resolution luminance signal; and generating a second image according to the compensated luminance signal and the original chrominance signal.

In order to achieve the above objective, the present invention further discloses a image acquisition device capable of compensating an image, adapted to reduce noise of a first image captured by the image acquisition device at a high International Standards Organization (ISO) mode, the image acquisition device comprising: an image capturing unit, for capturing a Bayer pattern from the first image; and a processing unit, electrically coupled to the image capturing unit for driving the image capturing unit to obtain the Bayer pattern from the first image, comprising a plurality of means as follows: a separating means, for respectively generating a high-resolution green pixel signal, an original binned low-resolution luminance signal, and an original chrominance signal according to the Bayer pattern; a transforming means, for generating a high-resolution analog luminance signal by utilizing the green pixel signal; and a combining means, for combining the high-resolution analog luminance signal and the original low-resolution luminance signal to output a compensated luminance signal, so as to utilize the compensated luminance signal and the original low-noise chrominance signal to generate a second image.

In the present invention, the luminance signal of the first image and the green pixel signal are obtained from the Bayer pattern, and different weighted superpositions are performed on the two signals according to different ISOs. Thus, information to which human eyes are sensitive can be superposed without reducing the resolution of the first image.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
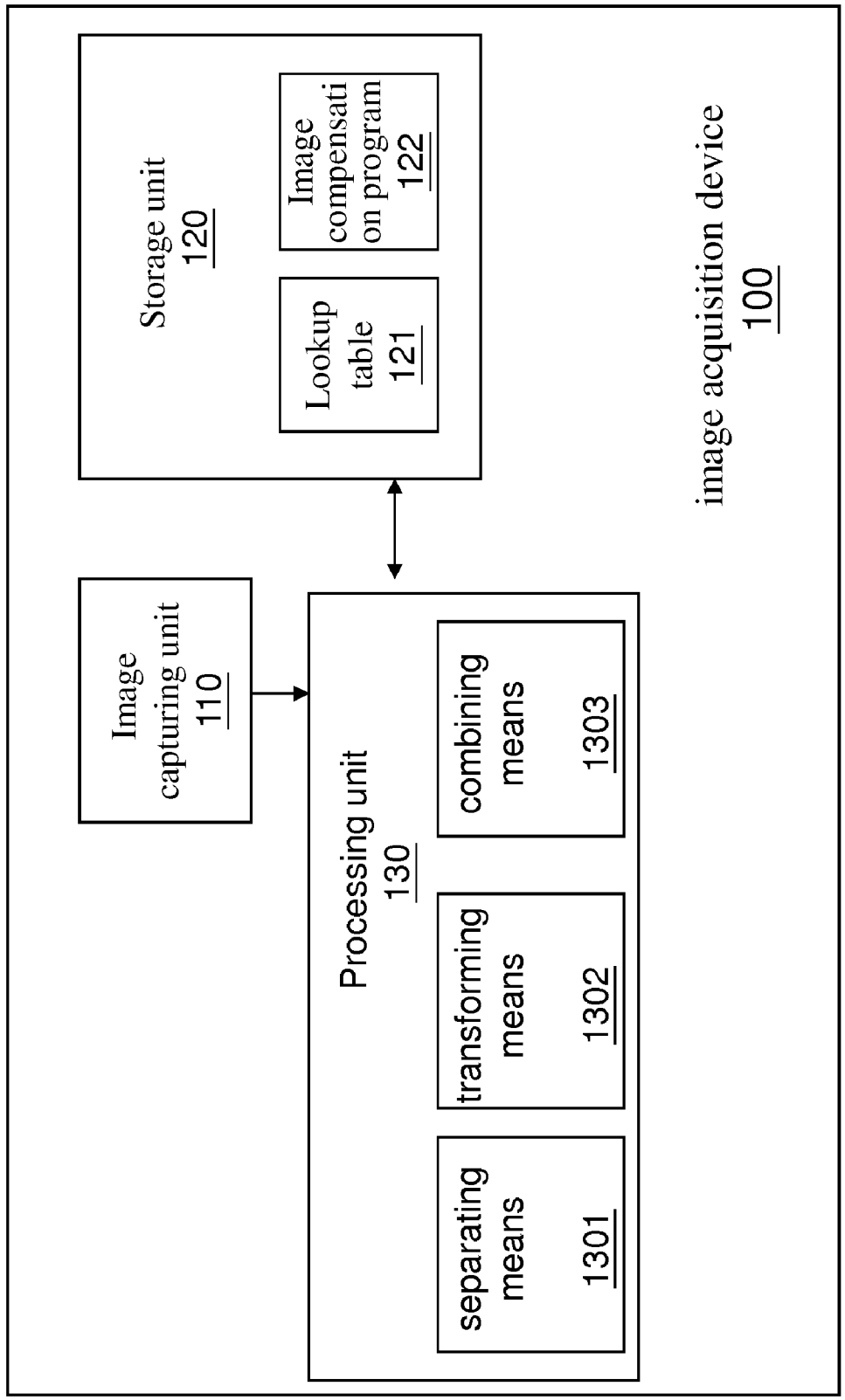
FIG. 1 is a schematic architectural view of the present invention.

Refer to FIG. 1, an image acquisition device 100 for implementing the present invention includes an image capturing unit 110, a storage unit 120 for storing a lookup table 121 and an image compensation program 122, and a processing unit 130 electrically coupled to the image processing unit 110 and the storage unit 120, and operates according to the image compensation program 120. The image capturing unit 110 is used for capturing a Bayer pattern from a first image photographed by the image acquisition device 100. What's more, processing unit 130 comprises a separating means 1301, a transforming means 1302, and a combining means 1303.

The image capturing unit 110 comprises a photosensitive element, In the photosensitive element, an array formed by millions of photosensitive units (or pixels) is covered on a surface of a transducer. To present accurate color of the first image, the position of each pixel on the image capturing unit 110 needs three color samples, which are normally three primary colors of red, green, and blue (RGB). However, if three layers of color photosensitive elements are disposed on the same pixel position, the cost of a digital camera will be increased significantly. Therefore, a method that uses a color filter array (CFA) to expose colors of a pixel is proposed. Currently, the most commonly used CFA is Bayer pattern.

Figure 2:
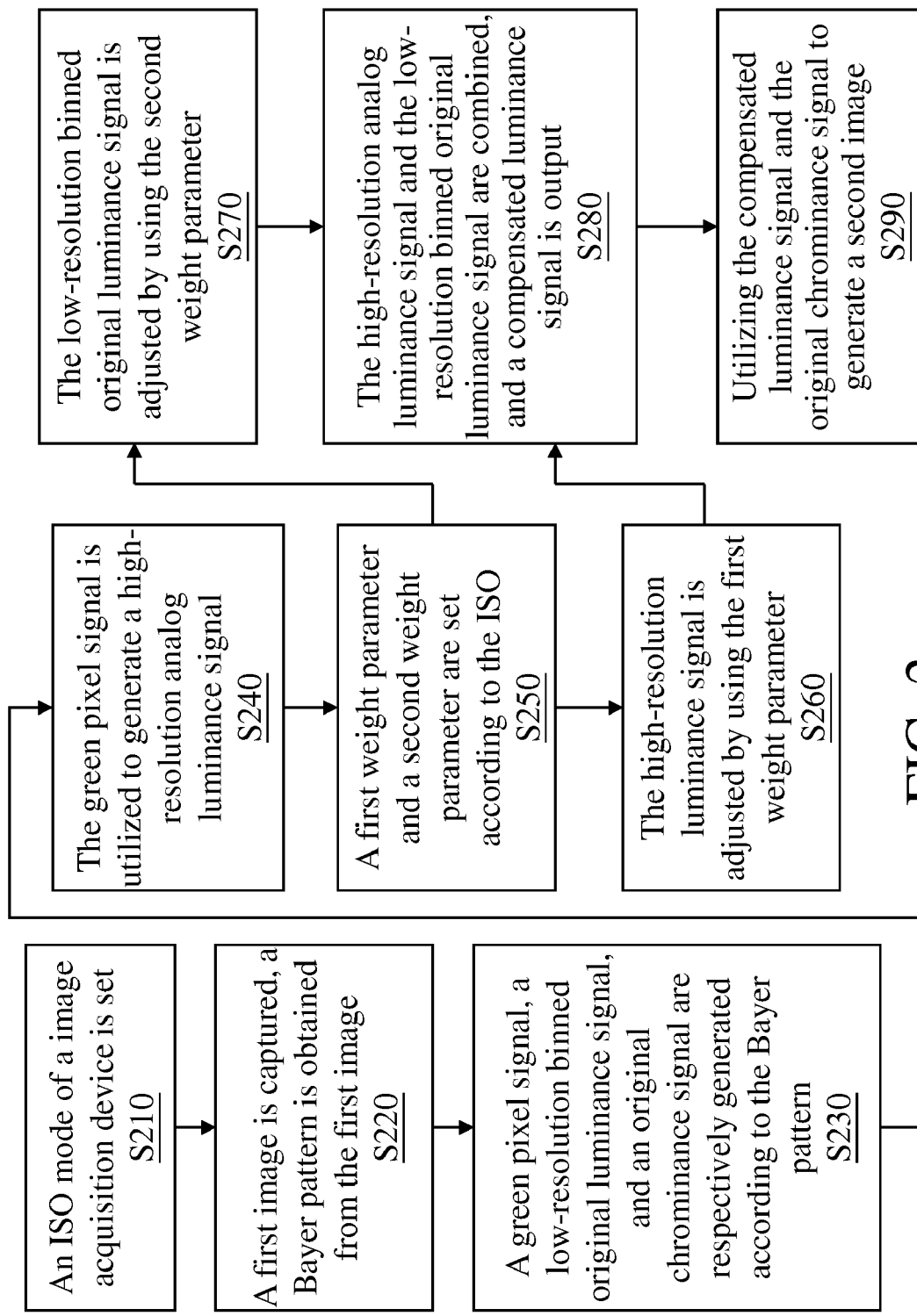
FIG. 2 is a flow chart illustrating operations of the present invention.

Refer to FIG. 2, an implementation aspect of the present invention includes the following steps. An ISO mode of the image acquisition device 100 is set (Step S210). The ISO mode can be manual for a user. Then, after the first image being captured by the image acquisition device 100, a Bayer pattern captured from the first image is obtained by the image capturing unit 110 driven by processing unit 110 (Step S220).

Figure 3:
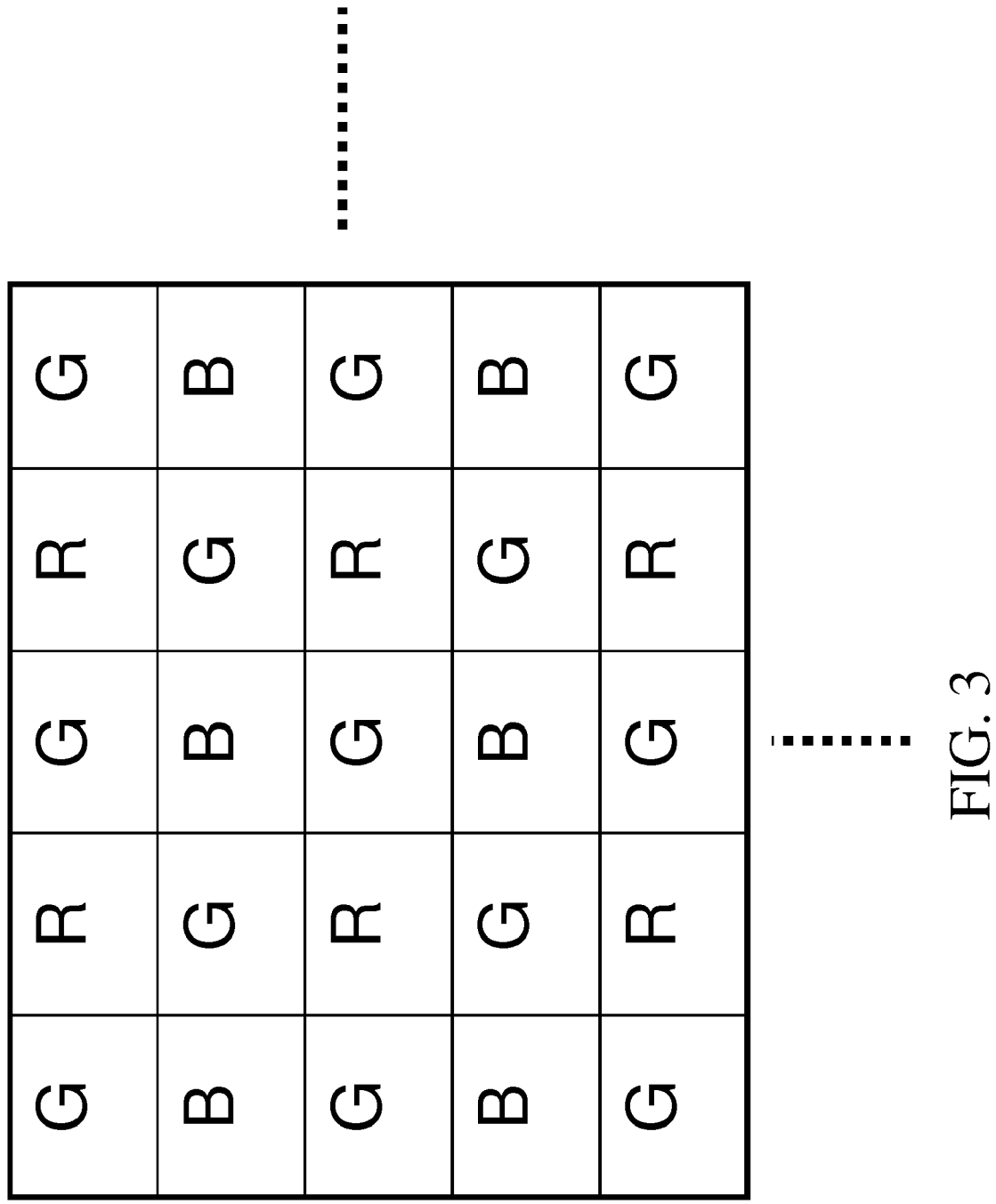
FIG. 3 is a schematic view of a Bayer pattern.

Further refer to FIG. 3, the Bayer pattern adopts the principle that human eyes are more sensitive in recognizing green than in recognizing red or blue. Therefore, in the CFA of the Bayer pattern, the number of green filters is twice of that of blue or red filters, such that every four pixels form a unit. The arrangement of the filters is as follows: in the first row, red filters and green filters are arranged alternately; and in the second row, green filters and blue filters are arranged alternately.

By utilizing separating means 1301 of the processing unit 130, a green pixel signal, a low-resolution binned original luminance signal, and an original chrominance signal are respectively generated according to the Bayer pattern (Step S230). The resolution of the generated green signal is generally higher than that of the binned image. The green signal and the binned image signal are respectively processed by a common image processing module of image acquisition device 100. A high-resolution analog luminance signal is generated after the green signal is image-processed, and a low-resolution luminance signal and a chrominance signal are generated after the binned image is image-processed. The processed binned image is characterized by low resolution and low noise.

By using transforming means 1302 of the processing unit 130, the green pixel signal can be utilized to generate a high-resolution analog luminance signal (Step S240).

A first weight parameter and a second weight parameter recorded in look up table 121 are set according to the set ISO mode, wherein each of the first weight parameter and the second weight parameter correspond to different ISO to adjust the green pixel signal and the original luminance signal respectively (Step S250).

The high-resolution luminance signal is adjusted by using the first weight parameter (Step S260). The low-resolution binned original luminance signal is adjusted by using the second weight parameter (Step S270). In this implementation aspect, the sum of the first weight parameter and the second weight parameter is set to 1.

The first weight parameter is used to adjust the high-resolution analog luminance signal generated by the green pixel signal. The second weight parameter is used to adjust the low-resolution binned original luminance signal. Here, the second weight parameter is determined according to the noise distribution of a sensor and the ISO required in actual shooting. When setting the ISO mode in a high value to result in great noise of the first image captured by the image acquisition device, the first weight parameter is recommended lower, so as to bring less noise to the first image, thus preventing the compensation effect from being reduced due to the influence of the noise. Meanwhile, when the first image is captured at a low ISO, the noise of the analog luminance signal is relatively small, so the first weight parameter may be increased. In the case that the first image needs further adjustment, the sum of the first weight parameter and the second weight parameter is not limited to be 1.

Figure 4:
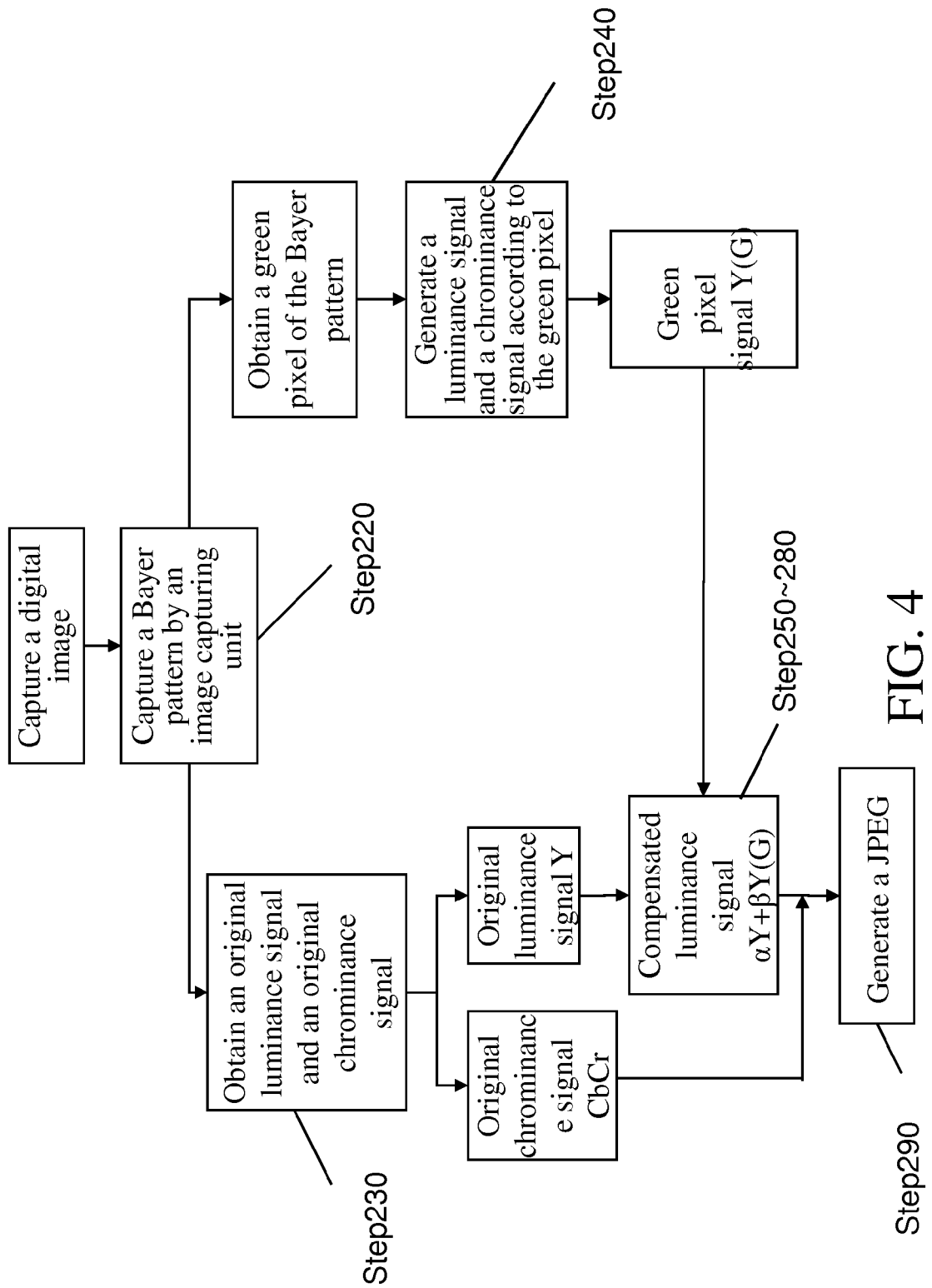
FIG. 4 is a schematic view illustrating operations of this implementation aspect.

The high-resolution analog luminance signal and the low-resolution binned original luminance signal are combined by combining means 1303, and a compensated luminance signal is output (Step S280). Utilizing the compensated luminance signal and the original chrominance signal to generate a second image (Step S290). After being obtained, the compensated luminance signal and the original chrominance signal are compressed in a Joint Photographic Experts Group (JPEG) format, so as to generate a compressed (second) image. The following example is given to illustrate the operational process of the present invention clearly. FIG. 4 is a schematic view illustrating operations of this implementation aspect.

In the present invention, the luminance signal of the original image and the analog luminance signal generated by the green pixel are obtained from the Bayer pattern, and different weighted superpositions are performed on the two luminance signals according to different ISOs. Thus, the information to which human eyes are sensitive can be superposed to increase the resolution of the original binned digital image while maintaining the low-noise quality of the original binned image.

What is claimed is:

1. An image compensation method, adapted to reduce noise of a first image captured by an image acquisition device at a high International Standards Organization (ISO) mode, the image compensation method comprising:

obtaining a Bayer pattern from the first image;

respectively generating a green pixel signal, a binned original luminance signal, and an original chrominance signal according to the Bayer pattern;

utilizing the green pixel signal to generate a high-resolution analog luminance signal;

combining the high-resolution analog luminance signal and the original luminance signal to output a compensated luminance signal; and utilizing the compensated luminance signal and the original chrominance signal to generate a second image.

2. The image compensation method according to claim 1, before the step of obtaining the Bayer pattern, further comprising:

setting an ISO mode of the image acquisition device.

3. The image compensation method according to claim 2, before the step of combining the green pixel luminance signal and the original luminance signal, further comprising:

setting a first weight parameter and a second weight parameter according the setting ISO mode;

adjusting the green pixel signal by using the first weight parameter; and adjusting the original luminance signal by using the second weight parameter.

4. The image compensation method according to claim 1, wherein the step of generating the second image comprises:

obtaining the compensated luminance signal and the original chrominance signal, and compressing the compensated luminance signal and the original chrominance signal into a Joint Photographic Experts Group (JPEG) format, so as to generate the second image.

5. An image acquisition device capable of compensating an image, adapted to reduce noise of a first image captured by the image acquisition device at a high International Standards Organization (ISO) mode, the image acquisition device comprising:

an image capturing unit, for capturing a Bayer pattern from the first image; and a processing unit, electrically coupled to the image capturing unit for driving the image capturing unit to obtain the Bayer pattern from the first image, comprising a plurality of means as follows:

a separating means, for respectively generating a high-resolution green pixel signal, an original binned low-resolution luminance signal, and an original chrominance signal according to the Bayer pattern;

a transforming means, for generating a high-resolution analog luminance signal by utilizing the green pixel signal; and a combining means, for combining the high-resolution analog luminance signal and the original low-resolution luminance signal to output a compensated luminance signal, so as to utilize the compensated luminance signal and the original low-noise chrominance signal to generate a second image.

6. The image acquisition device capable of compensating an image according to claim 5, further comprising a lookup table electrically coupled to the processing unit and used for recording a first weight parameter and a second weight parameter, wherein each of the first weight parameter and the second weight parameter correspond to different ISO to adjust the green pixel signal and the original luminance signal respectively.

7. The image acquisition device capable of compensating an image according to claim 6, further comprising a storage unit for storing the first image, the second image, and the look up table.

8. The image acquisition device capable of compensating an image according to claim 5, further comprising a storage unit for storing the first image and the second image.

* * * * *